United States Patent
Matteson et al.

(12) 
(10) Patent No.: US 6,240,154 B1
(45) Date of Patent: May 29, 2001

(54) SELF-ACTUATED LOUVERS FOR VENTING A CEDM COOLING SYSTEM OF A NUCLEAR REACTOR AND METHOD OF USING THE SAME

(75) Inventors: Donn M. Matteson; Daniel A. Peck, both of South Windsor, CT (US)

(73) Assignee: CE Nuclear Power LLC, Winsdor, CT (US)

( * ) Notice: Subject to any disclaimer, the term of this patent is extended or adjusted under 35 U.S.C. 154(b) by 0 days.

(21) Appl. No.: 09/286,660

(22) Filed: Apr. 6, 1999

(51) Int. Cl.[7] .............................. G21C 9/00; G21C 7/12
(52) U.S. Cl. .............................. 376/298; 376/243
(58) Field of Search .................... 376/298, 243, 376/287

(56) References Cited

U.S. PATENT DOCUMENTS 5,742,652 * 4/1998 Hankinson et al. ................. 376/298
5,930,321 * 7/1999 Harkness et al. .................... 376/298

* cited by examiner

Primary Examiner—Michael J. Carone
Assistant Examiner—Kyonytack K. Mun
(74) Attorney, Agent, or Firm—Rader, Fishman & Grauer

(57) ABSTRACT

An augmented cooling system for a CEDM in a nuclear reactor includes self actuated louvers or flap valve louvers which allow hot air from the head lift rig to vent and cooler ambient air to enter the rig in the event that pressure is lost for the forced cooled air which normally cools the CEDM.

27 Claims, 3 Drawing Sheets

SELF-ACTUATED LOUVERS FOR VENTING A CEDM COOLING SYSTEM OF A NUCLEAR REACTOR AND METHOD OF USING THE SAME

FIELD OF THE INVENTION

The present invention relates to the field of nuclear power plants. More particularly, the present invention relates to a self-actuating louver system that vents the CEDM cooling system of a nuclear reactor with ambient air when a forced stream of cooled air in the cooling system is discontinued.

BACKGROUND OF THE INVENTION

FIG. 1 illustrates a portion of nuclear reactor used in a nuclear power plant. The reactor head (100) communicates with the reactor vessel (not shown) in which the nuclear reaction takes place. A head lift rig (106) is mounted over the reactor head (100) and contains the control element drive mechanism (CEDM) (105).

The CEDM (105) is used to extend control rods (not shown) into the fissionable material in the reactor core in which the sustained nuclear reaction is occurring. The number of control rods used and the extent to which the control rods are extended into the reaction area controls the rate at which the nuclear reaction progresses. In the event of an emergency, an additional set of control rods can be rapidly extended into the core to halt the nuclear reaction entirely.

To shield the CEDM (105) from the heat of the reactor vessel, a heat shield of insulation (101) is provided as shown in FIG. 1. However, this insulation (101) alone is insufficient to keep the optimal temperature in the head lift rig (106). Consequently, a cooling system is also provided to control the temperature in the head lift rig (106).

The cooling system includes, for example, a pair of pipes (107) through which cooled air is forced into the head lift rig (106). The cooled air flows through the head lift rig (106), around the CEDM (105) and into a chamber (103) between the insulation (101) and the main body of the head lift rig (106). Exhaust holes (102) are provided in this chamber (103) to allow the cooled air to complete its circulation.

While this cooling system is adequate to control the temperature in the head lift rig (106), obvious problems will arise if the cooling system malfunctions or must be turned off for any reason. Without the flow of air illustrated in FIG. 1, the temperature inside the head lift rig (106) will quickly rise if a nuclear reaction is ongoing, or will stay high even if no reaction is being sustained.

Consequently, there is a need in the art for a device and method of supplementing the cooling system for a CEDM in the head lift rig of a nuclear reactor.

SUMMARY OF THE INVENTION

It is an object of the present invention to meet the above-described needs and others. Specifically, it is an object of the present invention to provide a self-actuating system that assists in venting heat from the head lift rig any time the flow of cooled air through the cooling system is discontinued.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a cooling system for a head lift rig of a nuclear reactor. The system includes at least one pipe through which cooled air is forced into the head lift rig; and a self-actuating louver over a vent opening in either of the at least one pipe or the head lift rig. When the cooled air is circulating, the louver is held closed by pressure created by the circulating air. But, when the cooled air is not circulated, the louver automatically falls open to allow hot air from the head lift rig to exhaust and cooler ambient air to enter the head lift rig.

According to the present invention, there may be two self-actuating louvers, one of which is disposed over a vent opening in the at least one pipe and one of which is disposed over a vent opening in the head lift rig.

Alternatively, the cooling system of the present invention may include a flap valve louver regulating a vent opening in each pipe that provides cooled air to the head lift rig. Similar to the system described above, when the cooled air is circulating, the flap valve louver is held closed by pressure created by the circulating air, but when the cooled air is not circulated, the flap valve louver automatically falls open to allow hot air from the head lift rig to exhaust and cooler ambient air to enter the head lift rig.

This system may also include a louver over a vent opening in the head lift rig which operates like the flap valve louver, namely, when the cooled air is circulating, the louver is held closed by pressure created by the circulating air, but when the cooled air is not circulated, the louver automatically falls open to allow hot air from the head lift rig to exhaust and cooler ambient air to enter the head lift rig.

The present invention also encompasses the methods of cooling a CEDM corresponding to the systems described above. Such a method may include the steps of (1) forcing cooled air through at least one pipe into the head lift rig; and (2) regulating a vent opening in either or both of the at least one pipe or the head lift rig with a self-actuating louver such that, when the cooled air is circulating, the louver is held closed by pressure created by the circulating air, but when the cooled air is not circulated, the louver automatically falls open to allow hot air from the head lift rig to exhaust and cooler ambient air to enter the head lift rig.

Alternatively, the method of the present invention may include the steps of: (1) forcing cooled air through at least one pipe into the head lift rig; and (2) regulating a vent opening in each pipe with a flap valve louver such that, when the cooled air is circulating, the flap valve louver is held closed by pressure created by the circulating air, but when the cooled air is not circulated, the flap valve louver automatically falls open to allow hot air from the head lift rig to exhaust and cooler ambient air to enter the head lift rig.

This method may also include the additional step of regulating a vent opening in the head lift rig with a self-actuating louver, such that, when the cooled air is circulating, the louver is held closed by pressure created by the circulating air, but when the cooled air is not circulated, the louver automatically falls open to allow hot air from the head lift rig to exhaust and cooler ambient air to enter the head lift rig.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
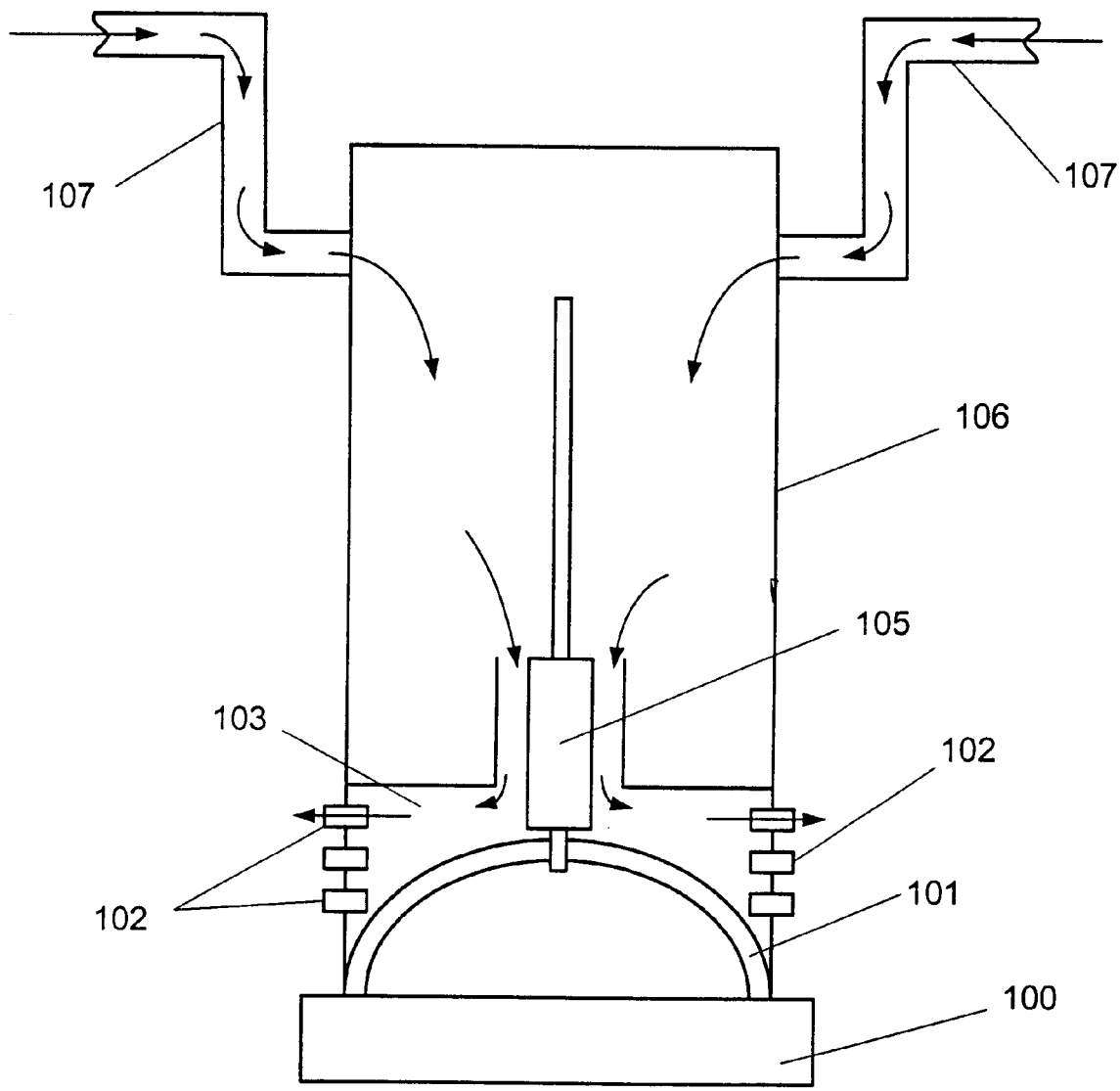
FIG. 1 is an illustration of a conventional cooling system for a head lift rig containing a CEDM in a nuclear reactor.
Figure 2:
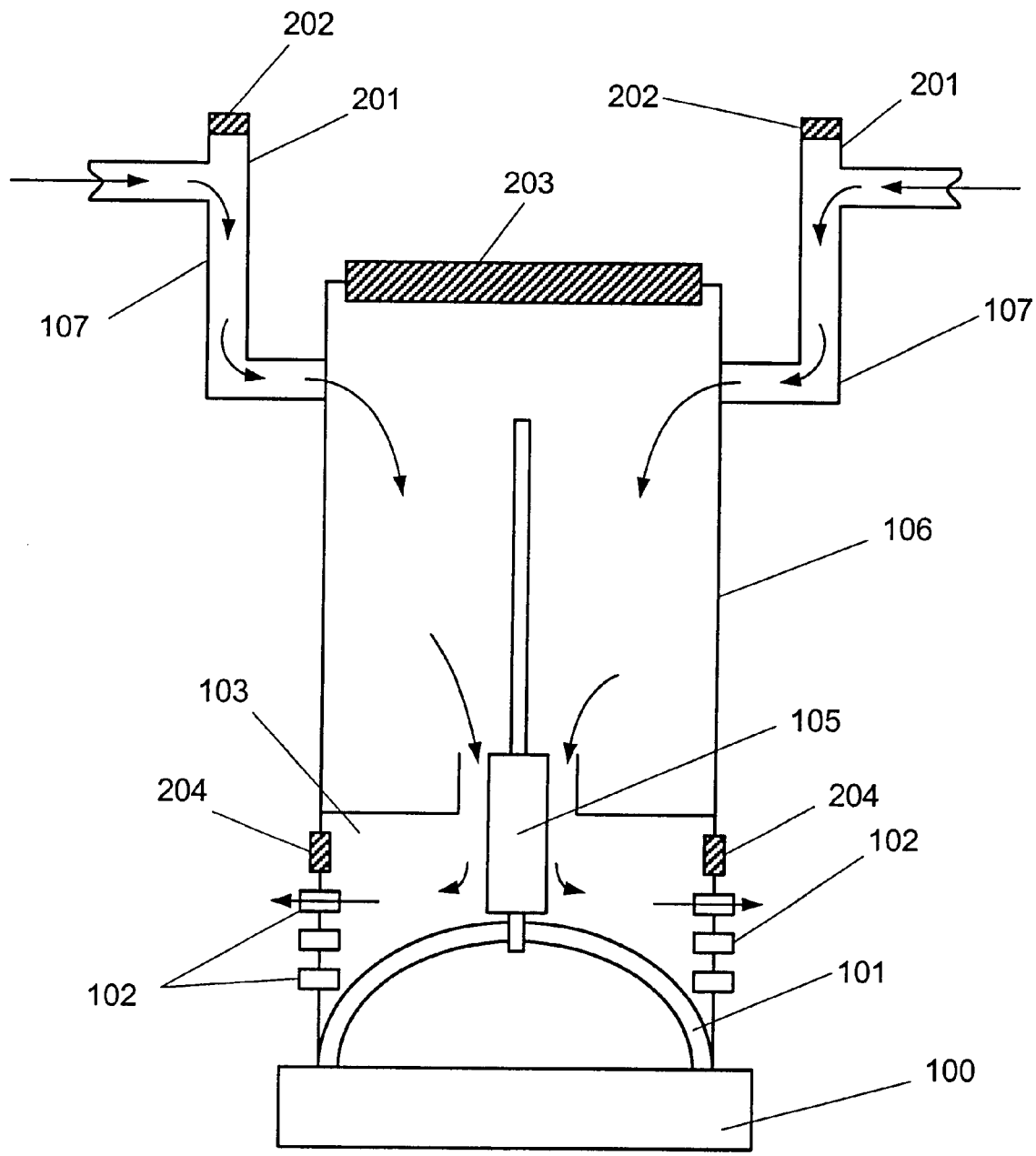
FIG. 2 is an illustration of an augmented cooling system for a head lift rig according to the principles of the present invention.

FIG. 2 illustrates a first embodiment of the present invention which is an augmented cooling system for a head lift rig (106). As in FIG. 1, the head lift rig (106) is cooled by a forced air system in which cooled air is forced under pressure into the head lift rig (106) through piping (107). The cooled air moves around and cools the Control Element Drive Mechanism (CEDM) (105) and is expelled through exhaust holes (102).

However, as shown in FIG. 2, vents (201) are added to the pipes 107. At the top of each of these vents (201) is a self-actuated louver (202). Each of these louvers (202) includes a series of substantially flat, elongated slats arranged parallel to each other across the opening of the vent (201). Each of the slats is freely rotatable about an axis which runs length-wise along each slat. Consequently, the slats may rotate between a closed position in which they lay flat across the vent (201), their edges overlapping such that the vent (201) is blocked, and an open position in which the slats are disposed perpendicular to their closed position so as to allow air to freely exhaust from the vent (201).

As the cooled air is forced through the pipes (107), pressure is created by the forced movement of the cooled air. The slats of the louvers (202) are shaped and weighted to respond to this pressure by remaining in the above-described "closed" position so long as the forced flow of cooled air creates pressure.

However, if the flow of forced air through the pipes (107) is discontinued for any reason, the pressure caused by that flow will dissipate. When this occurs, the slats of the louvers (202) will, under the influence of gravity, swing into the open position, thereby allowing hot air from the head lift rig (106) to vent and cooler ambient air to enter the head lift rig (106). The cool ambient air may enter through the exhaust holes (102).

Alternatively or additionally, a louver (203) may be incorporated into the head lift rig (106). This louver (203) operates in the same manner as the louvers (202), remaining closed so long as forced air is circulating and automatically opening when the pressure caused by such circulating air is removed.

Preferably, additional louvers (204) are added to the chamber (103). These louvers may be self-actuated louvers as well, which remain closed so long as the flow of air is maintained. However, when allowed to fall open, the louvers (204) allow cooler ambient air to flow directly into the chamber (103). This air is then heated by the heat in the chamber (103) and rises to escape through louver (203) or the upper louvers (202). This circulation allows the heat in chamber (103) to be quickly dissipated.

Figure 3:
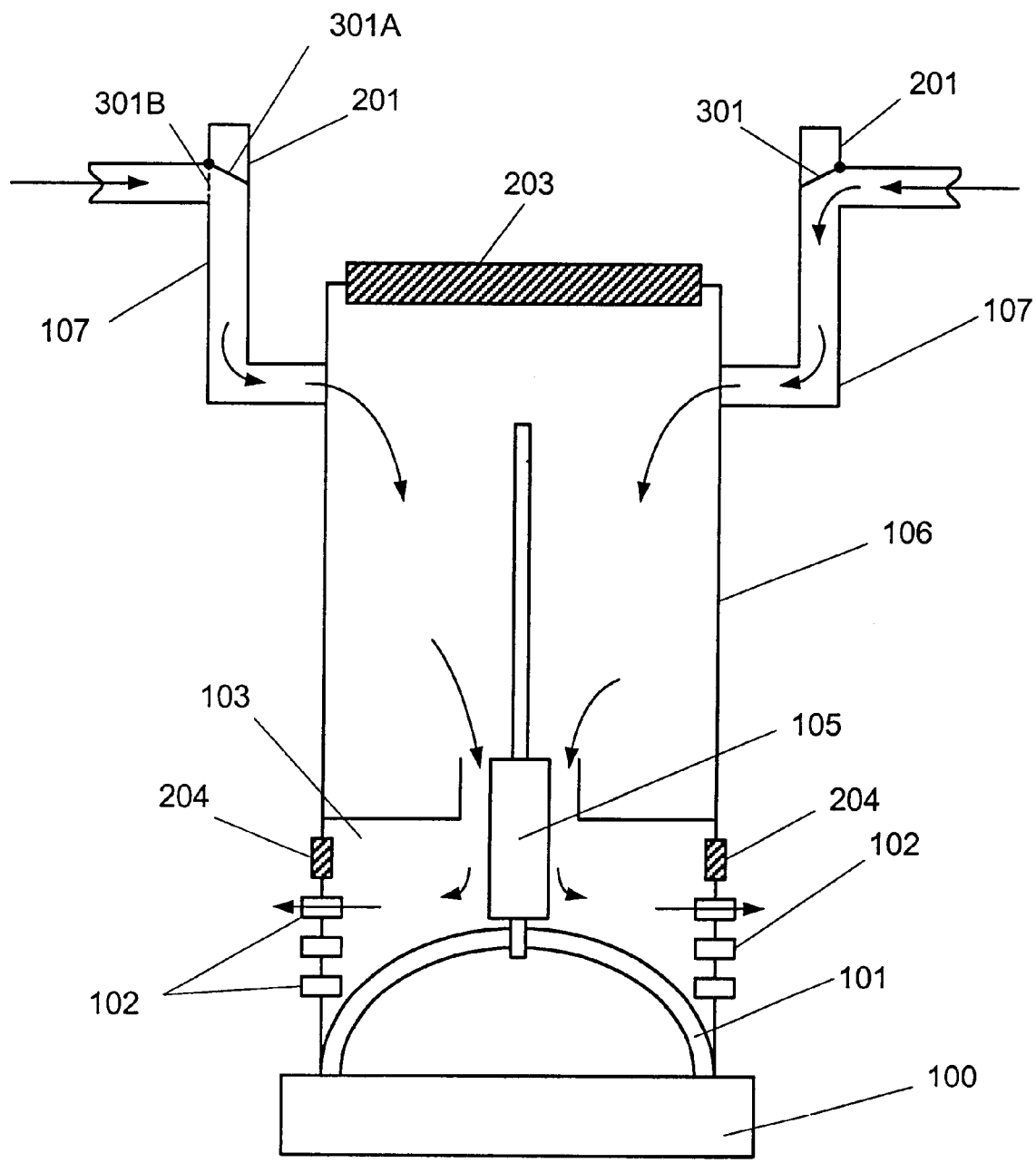
FIG. 3 is an illustration of an augmented cooling system for a head lift rig according to a second embodiment of the present invention.

A second embodiment of the present invention is illustrated in FIG. 3. The system of FIG. 3 is similar to that of FIG. 2. However, instead of the louvers (202), flap valve louvers (301) are used to regulate the vents (201).

The flap valve louvers (301) rotate between a first position (301A) and a second position (301B). During normal operation of the cooling system, refrigerated air is forced under pressure through the pipes (107) the pressure of this moving air forces the flap valve louvers (301) into the first position (301A) and holds the louvers (301) in this position. In the first position (301A), the louvers (301) block the vents (201).

Should the flow of air be discontinued for any reason, there will be no pressure holding the flap valve louvers (301) in the first position (301A). Under the influence of gravity, the louvers (301) will then fall to the second position (301B). In the second position (301B), the louvers (301) allow hot air from the head lift rig (106) to exhaust out the vents (201) and cooler ambient air to enter the head lift rig (106). The cool ambient air may enter through the exhaust holes (102).

As shown in FIG. 3, this embodiment of the invention may also include the louver (203) in the head lift rig (106). However, the louver (203) need not be used, leaving the flap valve louvers (301) to provide ventilation for the head lift rig (106).

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A cooling system for a CEDM contained in a head lift rig of a nuclear reactor comprising:
   at least one pipe through which cooled air is forced under pressure into the head lift rig; and
   means for regulating air flow;
   wherein, when said cooled air is circulating, said means is held closed by pressure created by said circulating air, but when said cooled air is not circulated, said means automatically fall open to allow hot air from said head lift rig to exhaust and cooler ambient air to enter said head lift rig.

2. The system of claim 1, wherein said means for regulating air flow is self-actuating means for regulating air flow through a vent opening in either of said at least one pipe or said head lift rig.

3. The system of claim 2, wherein said means are disposed over a vent opening in said at least one pipe.

4. The system of claim 2, wherein said means are disposed over a vent opening in said head lift rig.

5. The system of claim 2, wherein said means are disposed over a first vent opening in said at least one pipe and over a second vent opening in said head lift rig.

6. The system of claim 1, wherein said means for regulating air flow is a flap valve louver means for regulating a vent opening in each pipe.

7. The system of claim 6, wherein said at least one pipe comprises two pipes connected to said head lift rig.

8. The system of claim 6, further comprising a flow regulating means over a vent opening in said head lift rig, wherein, when said cooled air is circulating, said flow regulating means are held closed by pressure created by said circulating air, but when said cooled air is not circulated, said flow regulating means automatically fall open to allow hot air from said head lift rig to exhaust and cooler ambient air to enter said head lift rig.

9. A cooling-system for a CEDM contained in a head lift rig of a nuclear reactor comprising:

at least one pipe through which cooled air is, forced into the head lift rig; and a louver;

wherein, when said cooled air is circulating, said louver is held closed by pressure created by said circulating air, but when said cooled air is not circulated, said louver automatically falls open to allow hot air from said head lift rig to exhaust and cooler ambient air to enter said head lift rig.

10. The system of claim 9, wherein said louver is at least one self-actuating louver over a vent opening in either of said at least one pipe or said head lift rig.

11. The system of claim 10, further comprising a chamber within said head lift rig with exhaust openings for said forced cooled air, said chamber further comprising at least one louver which opens to admit cooler ambient air to said chamber when said cooled air is not circulated.

12. The system of claim 10, wherein said at least one louver is disposed over a vent opening in said at least one pipe.

13. The system of claim 10, wherein said at least one louver is disposed over a vent opening in said head lift rig.

14. The system of claim 10, wherein said at least one louver comprises at least two self-actuating louvers, one of which is disposed over a vent opening in said at least one pipe and one of which is disposed over a vent opening in said head lift rig.

15. The system of claim 9, wherein said louver is a flap valve louver regulating a vent opening in each pipe.

16. The system of claim 15, further comprising a chamber within said head lift rig with exhaust openings for said forced cooled air, said chamber further comprising at least one louver which opens to admit cooler ambient air to said chamber when said cooled air is not circulated.

17. The system of claim 15, wherein said at least one pipe comprises two pipes connected to said head lift rig.

18. The system of claim 15, further comprising a louver over a vent opening in said head lift rig, wherein, when said cooled air is circulating, said louver is held closed by pressure created by said circulating air, but when said cooled air is not circulated, said louver automatically falls open to allow hot air from said head lift rig to exhaust and cooler ambient air to enter said head lift rig.

19. A method of cooling a CEDM contained in a head lift-rig of a nuclear reactor comprising:

forcing cooled air through at least one pipe into the head lift rig; and regulating a vent opening in either of said at least one pipe or said head lift rig with a louver;

wherein, when said cooled air is circulating, said louver is held closed by pressure created by said circulating air, but when said cooled air is not circulated, said louver automatically falls open to allow hot air from said head lift rig to exhaust and cooler ambient air to enter said head lift rig.

20. The method of claim 19 wherein said louver is a self-actuating louver.

21. The method of claim 20, further comprising admitting cooler ambient air to a chamber within said head lift rig through at least one louver which opens when said cooled air is not circulated, said chamber having exhaust openings for said forced cooled air.

22. The method of claim 20, wherein said regulating comprises disposing said louver over a vent opening in said at least one pipe.

23. The method of claim 20, wherein said regulating comprises disposing said louver over a vent opening in said head lift rig.

24. The method of claim 20, wherein said regulating comprises using two self-actuating louvers, one of which is disposed over a vent opening in said at least one pipe and one of which is disposed over a vent opening in said head lift rig.

25. The method of claim 19 wherein said louver is a flap valve louver.

26. The method of claim 25, further comprising admitting cooler ambient air to a chamber within said head lift rig through at least one louver which opens when said cooled air is not circulated, said chamber having exhaust openings for said forced cooled air.

27. The method of claim 25, further comprising regulating a vent opening in said head lift rig with a self-actuating louver, wherein, when said cooled air is circulating, said louver is held closed by pressure created by said circulating air, but when said cooled air is not circulated, said louver automatically falls open to allow hot air from said head lift rig to exhaust and cooler ambient air to enter said head lift rig.

* * * * *